(12) United States Patent
De Frenne

(10) Patent No.: US 6,334,517 B1
(45) Date of Patent: Jan. 1, 2002

(54) ADJUSTMENT DEVICE FOR A HYDRAULIC SHOCK ABSORBER

(75) Inventor: Pierre De Frenne, Montauban (FR)

(73) Assignee: Amortisseur Donerre, Montauban (FR)

( * ) Notice: Subject to any disclaimer, the term of this patent is extended or adjusted under 35 U.S.C. 154(b) by 0 days.

(21) Appl. No.: 09/401,726

(22) Filed: Sep. 23, 1999

(51) Int. Cl.[7] ................................................. F16F 9/48
(52) U.S. Cl. ..................................... 188/285; 188/314
(58) Field of Search .................................. 188/285, 314, 188/315, 319.1, 319.2, 322.13, 322.14, 299, 286, 287; 267/64.22, 64.18

(56) References Cited

U.S. PATENT DOCUMENTS

| | | | |
|---|---|---|---|
| 3,945,626 A | | 3/1976 | Tilkens |
| 4,131,266 A | * | 12/1978 | Carter .......................... 188/315 |
| 4,153,237 A | * | 5/1979 | Supalla ........................ 188/314 |
| 4,546,959 A | | 10/1985 | Tanno |
| 4,749,068 A | | 6/1988 | Sirven |
| 4,928,799 A | * | 5/1990 | Zschiesche ................. 188/314 |
| 5,597,054 A | * | 1/1997 | Nagai et al. ................ 188/315 |
| 5,833,036 A | * | 11/1998 | Gillespie .................... 188/285 |

FOREIGN PATENT DOCUMENTS

| | | |
|---|---|---|
| DE | 2 323 361 | 11/1974 |
| EP | 0 346 040 A2 | 12/1989 |
| EP | 0 663 308 A1 | 7/1995 |

* cited by examiner

Primary Examiner—Robert J. Oberleitner
Assistant Examiner—Robert A. Siconolfi
(74) Attorney, Agent, or Firm—Nixon & Vanderhye

(57) ABSTRACT

This invention relates to an adjustment device for a hydraulic shock absorber.

This hydraulic shock absorber device is characterized in that it comprises a monoblock head (1) designed to be fitted with a removable shock absorber cylinder, a fluid reservoir and adjustment device (2, 3, 6) for high shock absorber piston displacement speeds and adjustment device (2, 3, 4) for low shock absorber piston displacement speeds, the monoblock head (1) comprising a duct enabling fluid circulation between the shock absorber and the reservoir, in which the high and low speed adjustment device (2, 3, 4, 6) are assembled such that their axes of symmetry are coaxial with the duct.

9 Claims, 3 Drawing Sheets

ADJUSTMENT DEVICE FOR A HYDRAULIC SHOCK ABSORBER

FIELD OF THE INVENTION

This invention relates to an adjustment device for a hydraulic shock absorber that can be used on any type of vehicle and particularly on all-terrain vehicles.

European patent EP 0 237 085 describes a hydraulic shock absorber comprising an adjustment device mounted between the shock absorber body and a monoblock fluid reservoir connected to the upper part of the cylinder forming the shock absorber. The shock absorber adjustment device is located on the junction between the reservoir and the shock absorber, and can be used to adjust the shock absorber compression force by means of two knurled wheels, without disassembling the shock absorber. Actions on the knurled wheels adjust expansion and compression of the shock absorber. However, this device is not capable of making different adjustments for low and high displacement speeds of the shock absorber piston. Furthermore, this device puts the adjustment means into communication with either the piston or the reservoir, through two pipes. This device also comprises a large number of parts and it is difficult to assemble.

International patent application WO 98/03361 deposited by the applicant also describes a hydraulic shock absorber system comprising a shock absorber and a reservoir connected through a pipe to the upper part of the cylinder in which the shock absorber piston is located. The system comprises shock absorber adjustment means located on the reservoir, for low and high speeds. However, this device comprises many parts and the reservoir has to be disassembled to adjust the shock absorber for high speeds.

OBJECTS AND SUMMARY OF THE INVENTION

Therefore, the purpose of this invention is to overcome the disadvantages of prior art by proposing an adjustment device with a simple design that will enable separate adjustment of the shock absorber for low and high piston displacement speeds, this adjustment being made without disassembling the shock absorber and without the use of special tools.

This purpose is achieved by the fact that the device according to the invention comprises a monoblock head designed to be fitted with firstly a cylinder containing the shock absorber piston, and secondly with a oil reservoir and adjustment means for low shock absorber piston displacement speeds and for high shock absorber piston displacement speeds, the monoblock head comprising a duct enabling oil circulation between the shock absorber and the reservoir, in which the low speed adjustment means and the high speed adjustment means are assembled such that their axes of symmetry are coaxial with the duct.

According to another feature, the low and high speed adjustment means are assembled in the monoblock head through a cavity on the duct, such that they define two different paths for passage of shock absorber oil to the reservoir depending on the displacement speed of the shock absorber piston, a first path being used by the oil during low speeds and a second path being used during high speeds.

According to another feature, shock absorber high speed adjustment means comprise firstly a compression valve assembled so that it slides coaxially on a first end of a first screw assembled so that it is adjustable in the duct, and secondly elastic means assembled on the first screw exerting a determined pressure on the compression valve when it is assembled on the first screw, such that the compression valve tends to move away from the first screw to define a second oil path as a function of the oil pressure exerted on the compression valve.

According to another feature, the shock absorber low speed adjustment means comprise firstly a second screw comprising a needle with a determined shape, assembled adjustably inside a coaxial drilling in the first screw, this drilling comprising a first section with determined dimensions exceeding the dimensions of the second screw, a second section with determined dimensions smaller than the dimensions of the second screw, these two sections being attached through a third section with a determined shape complementary to the shape of the needle in the second screw, and secondly means of draining oil back to the reservoir, formed on the compression valve and the first screw, to define the first path.

According to another feature, the elastic means consist of Belleville washers mounted in opposition.

According to another feature, the compression valve is formed of a hollow cylinder comprising two rings, between which there is at least one radial orifice forming means of draining oil to the reservoir.

According to another feature, the first screw consists of a hollow cylinder comprising at least one radial orifice in its first end forming means of draining oil to the reservoir, and a thread on its outside surface for adjusting the pressure of the elastic means on the compression valve.

According to another feature, the first and second screws comprise means of identifying the shock absorber setting comprising firstly at least one notch on the outside surface of the second screw parallel to its axis of symmetry, and secondly a radial slot on the first screw in which a ball and an elastic means are assembled, such that the ball cooperates with a notch in the second screw.

According to another feature, the needle in the second screw and the third drilling section in the first screw is in the shape of a truncated cone.

According to another feature, the first and second screws comprise means of adjusting them using conventional tools such as a spanner and/or a screwdriver.

According to another feature, the outside surface of the compression valve comprises at least one notch parallel to its axis of symmetry.

According to another feature, purge means are located on the monoblock head vertically above the reservoir attachment area and lead into the duct through a cavity.

Other special features and advantages of this invention will become clearer after reading the following description with reference to the attached drawings.

DESCRIPTION OF THE PREFERRED EMBODIMENT

Figure 1:
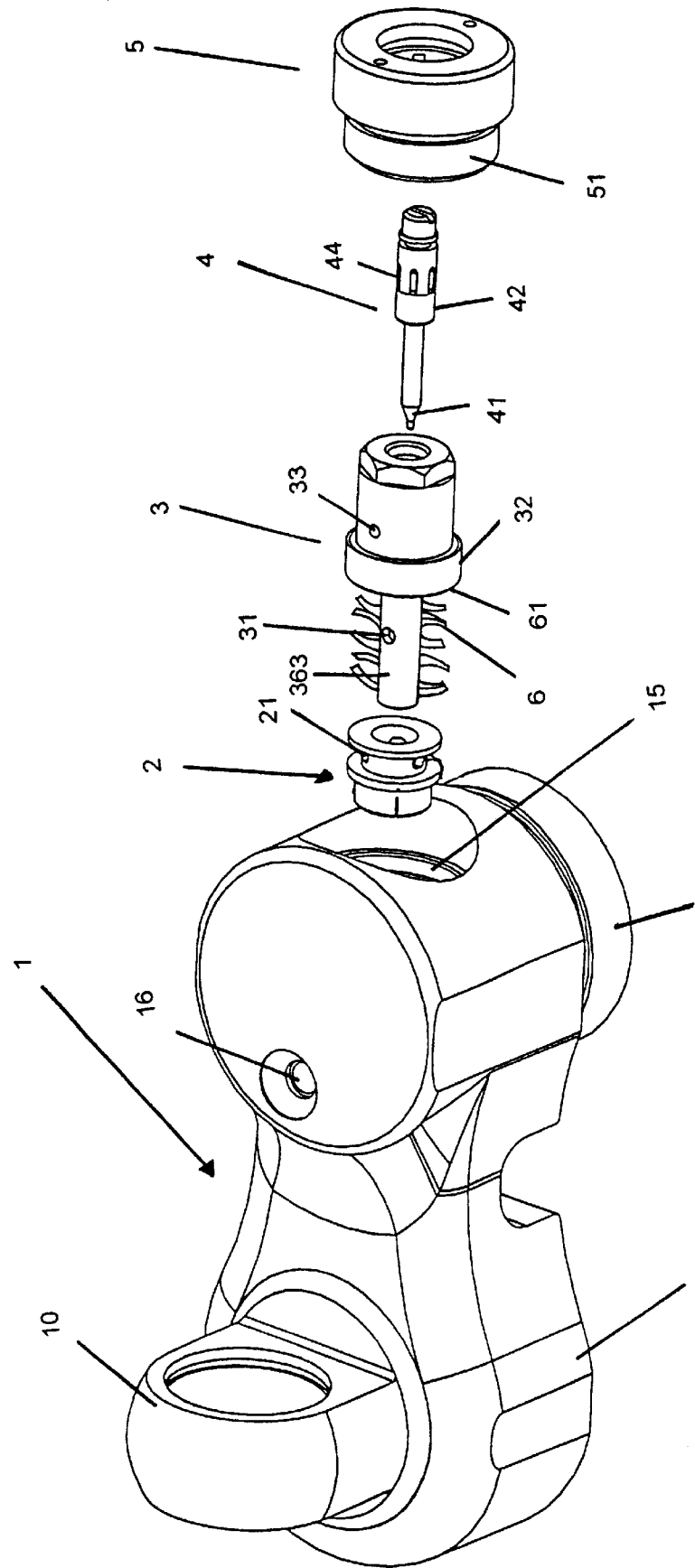
FIG. 1 shows an exploded perspective view of the device according to the invention.

FIG. 1 shows an exploded perspective view of the device according to the invention. The hydraulic shock absorber adjustment device according to the invention comprises a monoblock head (1) comprising means (11), of assembling a shock absorber cylinder (not shown), an assembly means (10), for example of the eyelet type on a vehicle and means (12) of attaching a oil reservoir (not shown). This device can be used with a conventional hydraulic shock absorber, in particular comprising a cylindrical hollow body and a piston delimiting two working volumes inside the cylinder. As a nonrestrictive example, the shock absorber used is as described in the international patent application WO 98/03361 deposited by the applicant. The reservoir is a well known type of reservoir, for example of the type described in this international patent application and it performs the same functions. Oil transit from the shock absorber cylinder to the reservoir takes place through a duct (13 FIG. 2) which will be described later. The device according to the invention also comprises shock absorber adjustment means (2, 3, 6) for high piston speeds and adjustment means (2, 3, 4, 21, 31) for low piston speeds High speed adjustment means (2, 3, 6) comprise a compression valve (2) assembled to slide on a cylindrical sleeve (363) in a first screw (3) and elastic means (6), for example consisting of Belleville washers, also assembled on the cylindrical sleeve (363) and in contact with a shoulder (61) on the first screw (3) to exert a determined pressure on the other side on valve (2), such that the compression valve (2) tends to move away from the first screw (3). The low speed adjustment means (2, 3, 4, 21, 31) comprise firstly a second screw (4) comprising a needle (41) with a determined shape assembled in an adjustable manner in a drilling (35) in the first screw (3) and secondly, means (21, 31) of draining fluid into the reservoir, made on the compression valve (2) and on the first screw. These means (2, 3, 4, 6, 21, 31) of adjusting high and low speeds are mounted in a cavity (15) on the monoblock head (1) through a fixing nut (5), such that their axes of symmetry are coincident with the axis of symmetry of the duct (13, FIG. 2). The nut (5) is assembled in the monoblock head (1) by means of a thread (51) in the nut (5) cooperating with a tapping (154, FIG. 2) in the monoblock head (1). The shock absorber adjustment means (2, 3, 4, 6) are assembled by a thread (32) on the first screw (3) that cooperates with a tapping (not shown) in the nut (5). This tapping (not shown) is also used for adjustment of the first screw (3). Furthermore, nut (5) guarantees leak tightness of the assembly. The device according to the invention could comprise purge means (16) located on part of the monoblock head (1) vertically in line with the reservoir assembly means (12).

Figure 2:
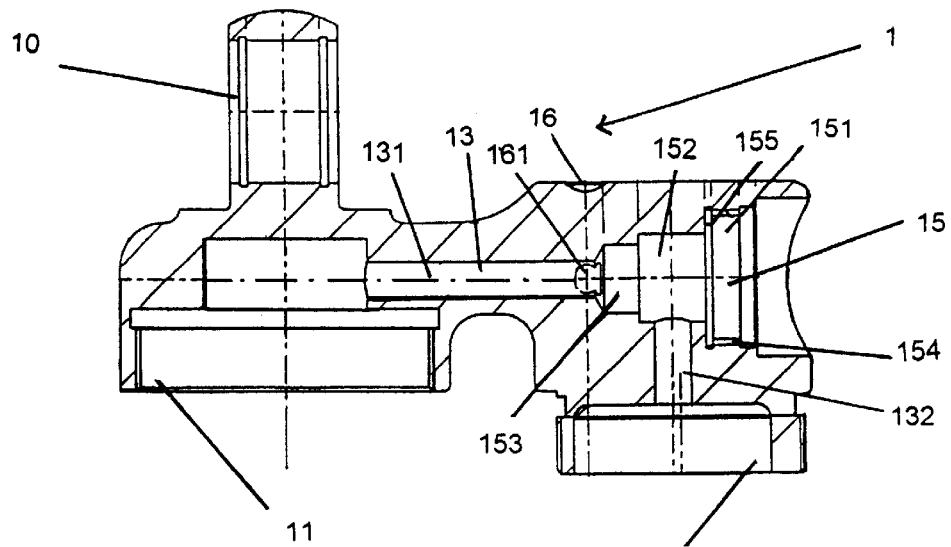
FIG. 2 shows a sectional view of the monoblock head.

FIG. 2 shows a sectional view of the monoblock head. The monoblock head (1) comprises a cavity (15) formed of several cylindrical segments (151, 152, 153) in which high and low speed adjustment means (2, 3, 4, 6) are assembled. A first segment (151) located closest to the outside of the monoblock head (1) will be fitted with the attachment nut (5) through a tapping (154) that cooperates with the thread (51 FIG. 1) located on the outside surface of the attachment nut (5) A second segment (152) adjacent to the first segment (151) comprises an orifice in which there is a vertical section (132) of the duct (13) between the shock absorber cylinder (not shown) and the reservoir (not shown). The first and second segments (151, 152) are separated by a groove (155) in which a seal will be fitted. A third segment (153) adjacent to the second segment (152) is coaxial with a horizontal section (131) of the duct (13) leading into the upper part of the shock absorber cylinder (not shown). Purge means (16) lead into a cavity (161) located at the end of the third segment (153) in the horizontal section (131) of the duct (13).

Figure 3:
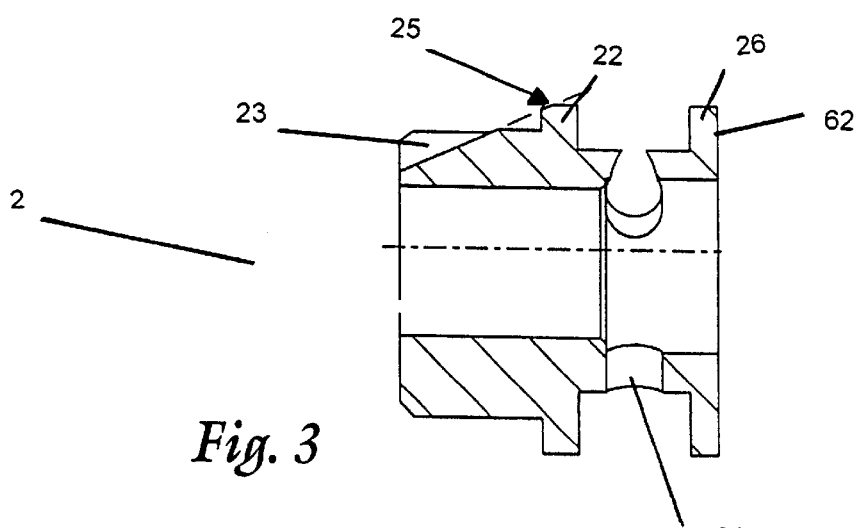
FIGS. 3 and 4 show a sectional view and a side view of the compression valve, respectively.
Figure 4:
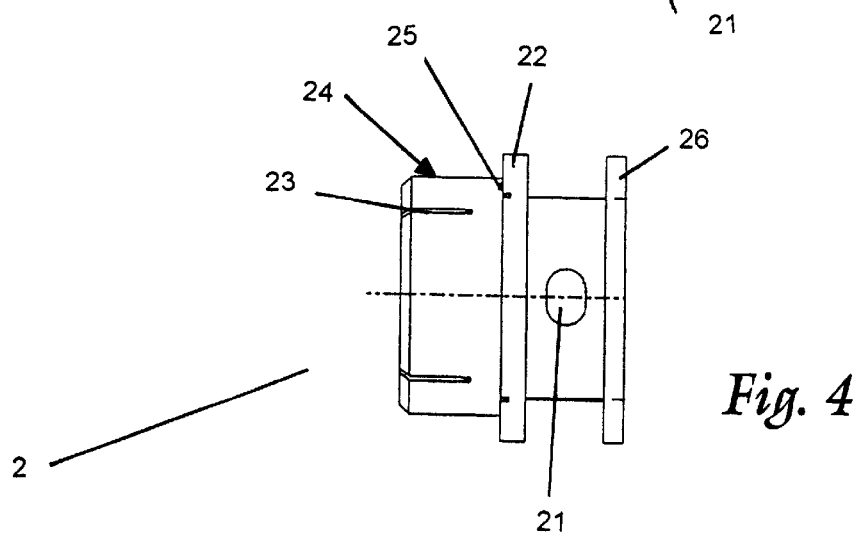

FIGS. 3 and 4 show a sectional view and a front view of the compression valve, respectively. The compression valve (2) is composed of a hollow cylinder comprising two parallel rings (22, 26). There is at least one radial orifice (21) forming means of draining oil into the reservoir, between the two rings (22, 26), thus connecting the inside of the compression valve (2) to the outside. This or these orifice(s) (21) are involved in the process of draining oil for low shock absorber piston speeds, as will be described later. The outer surface (24) of the compression valve (2) adjacent to one (22) of the two rings (22, 26) could comprise at least one notch (23) parallel to the axis of symmetry of the valve (2) and has a determined shape, for example beveled, this or these notch(es) (23) possibly continuing along the adjacent ring (22) through a notch (25) for example in the shape of a bevel. This or these notch(es) (23, 25) control progressive opening of the passage formed firstly by the third segment (153, FIG. 2) of the cavity (15, FIG. 2) adjacent to duct (13), the inside diameter of which corresponds to the outside diameter of the cylindrical part (24), and secondly by the second segment (152) which leads through the vertical section (132) of the duct (13) into the reservoir, the area of the compression valve (2) between the two rings (22, 26) being located facing this vertical section (132). This provides progressive damping of the shock absorber piston for high speeds.

Figure 5:
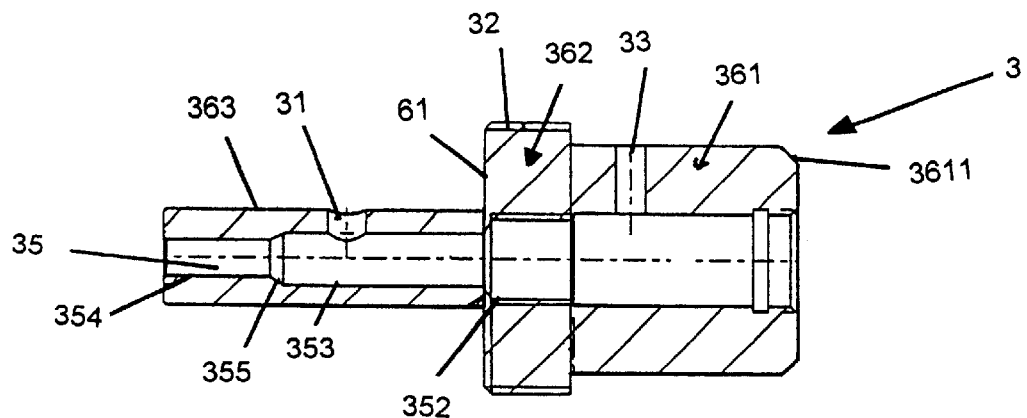
FIGS. 5 and 6 show a sectional view and a perspective view of the first screw, respectively.
Figure 6:
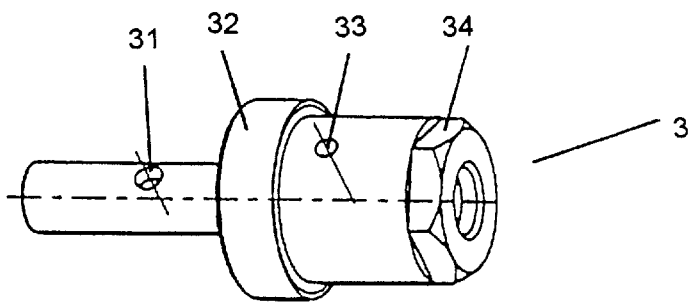

FIGS. 5 and 6 show a sectional view and a perspective view of the first screw, respectively. The first screw (3), called the high speed adjustment screw, consists of several hollow cylinders (361, 362, 363) with different diameters forming a coaxial drilling (35). This drilling will be fitted with the second screw (4, FIGS. 1 and 7) described later. A first cylinder (361) forming the free end of the first screw (3) located towards the outside of the monoblock head (1 FIGS. 1 and 2) comprises means (3611) by which a conventional tool such as a spanner can be used to rotate the first screw (3). This first cylinder (361) comprises, for example, a first radial slot (33) designed to be fitted with means (not shown) of marking the adjustment of the second screw (4 FIG. 1) For example, these means may consist of a ball mounted on an elastic means like a spring, and held in place by a screw to exert a thrust on the ball, directed towards the center line of the first segment (361). A second cylinder (362) comprises a thread (32) on its outside surface, which will cooperate with the tapping in the nut (5 FIG. 1) fixing the adjustment means (2, 3, 4, 6, FIG. 1) firstly for assembly of the second screw (3) on the nut (5) and secondly to adjust the first screw (3). The plane surface (61) of the second cylinder (362) located opposite the first cylinder (361) forms a shoulder (61) on which the Belleville washers (6, FIG. 1) will bear. The second bearing surface of the washers (6) consists of the outside surface (62, FIG. 3) of the ring (26, FIG. 3) of the compression valve (2) not adjacent to the cylindrical surface (24, FIG. 3). The second cylinder (362) also comprises a tapping (352) on the inside surface of the corresponding drilling (35) cooperating with a thread (42, FIG. 7) on the second screw (4), so that the second screw (4, FIG. 3) can be assembled in the monoblock head (1) and adjusted. A third segment (363) forming the cylindrical sleeve on which the washers (6, FIG. 1) and the compression valve (2, FIG. 1) are assembled, also comprises at least one radial orifice (31) leading into the drilling (35) in the third segment (363). This drilling (35) comprises two sections (353, 354) with determined dimensions, namely a first section (353) with an inside diameter exceeding the outside diameter of the second screw (4, FIG. 1 and 7), and a second section (354) with an inside diameter less than the outside diameter of the second screw (4, FIGS. 1 and 7). These two sections (353, 354) are connected by a third section (355) with a determined complementary shape in the form of a needle (410, FIGS. 1 and 7) made at the end of the second screw (4, FIG. 7).

Figure 7:
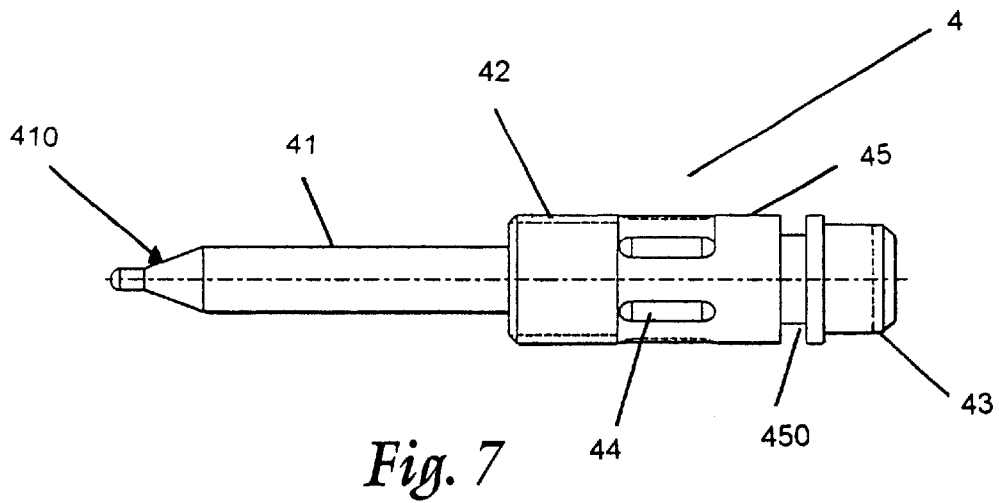
FIG. 7 shows a side view of the second screw.

FIG. 7 shows a front view of the second screw. The second screw (4) is composed of two adjacent cylindrical sections (41, 45). A first section (45) comprises a screw head (43) at its free end, or an equivalent means which can be used to rotate the second screw (4) using a conventional tool. This section (45) also comprises a thread (42) that cooperates with the tapping (352, FIG. 5) on the first screw (3, FIGS. 1 and 5), when the adjustment means (2, 3, 4, 6, FIG. 1) are assembled. The first cylindrical section (45) comprises, for example, at least one notch (44), parallel to the axis of symmetry of the second screw, cooperating with the ball in the adjustment means (not shown) of the second screw (4) assembled in the slot (33, FIG. 5) on the first screw (3, FIG. 5). The free end of the second section (41) comprises a needle (410) with a determined shape, for example a truncated cone. This particular shape is also formed on the third section (351, FIG. 5) of the first screw (3, FIGS. 1 and 5). Any other ellipsoid or spherical or any other shape could replace the truncated cone. A seal is fitted in a groove (450) located between the recesses (44) and the screw head (43).

The operating principle of the adjustment device according to the invention will now be explained with reference to all the figures. When the adjustment means (2, 3, 4, 6) and the attachment means (5) of the said means (2, 3, 4, 6) are assembled in the monoblock head (1), the compression valve (2) is located between the third segment (153) and the second segment (152) of the cylindrical cavity (15) in the monoblock head (1). The first screw (3) screws onto the thread (154) on the first segment (151) in the same monoblock head (1). The second screw (4) is screwed by its thread (42) into the tapping (352) of the first screw (3), in order to create the space required for the required response of the shock absorber piston at low speed, between the needle (410) and third section (355) of the drilling (35) in the first screw (3). The attachment means (5) also seal the device. In the at-rest configuration, the elastic means (6) apply a determined pressure to the compression valve (2), such that the annular flange (22) adjacent to the cylinder (24) of the compression valve (2) bears on the shoulder formed between the third segment (153) and the second segment (152) of the monoblock head (1). Thus, the adjustment means (2, 31 4, 6) are assembled on the duct (13) between the horizontal section (131) and the vertical section (132). They then define two different paths for oil passing from the shock absorber to the reservoir. These two paths depend on the piston displacement speed in the shock absorber.

When the shock absorber piston moves at low speed, it flushes oil into the reservoir which passes into the drilling (35) in the first screw (3). Oil then flows in the interval between the needle (410) and the third section (355) of the first screw, then through each radial orifice (31) in the first screw (3), then through each radial orifice (21) in the compression valve (2) and finally in the vertical section (132) of the duct (13). When the shock absorber piston moves at high speed, the oil flow becomes high, the interval formed between the needle (410) and the third section (355) is then saturated. The oil then exerts a pressure on the compression valve (2). The compression valve (2) will then slide on the third segment (363) of the first screw (3), compressing the elastic washers (6). When the compression of the elastic washers (6) reaches a determined value, the position of the compression valve (2) enables the oil to pass into the reservoir through an interval delimited by the notches (23) formed in the outside surface (24) of the compression valve (2) and the shoulder between the second and third segments (152, 153) of the cavity (15) and the annular flange (22) facing it in the vertical section (132) of the duct (13). Once the oil pressure exerted on the compression valve (2) reduces, the compression valve returns to its initial position due to the pressure of the elastic means (6). The notches (23) formed on the outside surface (24) of the compression valve (2) and the notches (25) formed on the ring (22) of valve (2) give, for example, progressive oil displacement towards the reservoir. Due to these notches (23, 25), oil starts to enter the reservoir through the interval formed between the compression valve (2) and the shapes of the cylindrical cavity (15) in the monoblock head (1), before the maximum displacement of the compression valve (2).

The shock absorber is adjusted by acting either on the first screw (3) for high speed adjustment of the shock absorber, or on the second screw (4) for low speed adjustment of the shock absorber. When the user adjusts the first screw (3), he modifies the pressure exerted by the elastic means (6) on the compression valve (2), thus modifying the oil pressure necessary to displace the compression valve (2). When the user adjusts the second screw (4), he modifies the interval between the needle (410) and the third section (351) in the drilling (35) in the first screw (3), thus modifying the maximum oil flow through this interval.

The device according to the invention has a simple design and is easy to assemble because it only consists a few parts (five without standard elastic means). Furthermore, this device can be used to adjust the shock absorber for low and high piston speeds using conventional tools, for example like a screwdriver and a spanner, without disassembling the shock absorber.

It is obvious that other modifications that an expert in the subject could make are also within the scope of the invention.

What is claimed is:

1. An adjustment device for a hydraulic shock absorber having a cylinder and a piston in said cylinder and an oil reservoir, comprising:

a head for connection to the shock absorber cylinder and having a cavity and a linearly extending duct enabling oil circulation between the shock absorber and the reservoir;

adjustment means for each of respective high and low shock absorber piston displacement speeds;

said low speed adjustment means and said high speed adjustment means in part defining first and second paths for flowing shock absorber oil to the reservoir as a function of the displacement speed of the shock absorber piston during low and high speeds, respectively;

said high speed adjustment means including a first screw, a compression valve slidable coaxially on a first end portion of said first screw for axial displacement therealong and a spring carried by said first screw for biasing said compression valve for movement away from said first screw such that said compression valve in part defines said second oil path;

said low speed adjustment means including a second screw having a needle coaxially disposed within a bore of said first screw, said bore including a first section having a first dimension exceeding a first dimension of the second screw, a second section having a second dimension smaller than the dimension of the second screw, said first and second sections being connected through a third section having a shape complementary to the shape of the needle of the second screw;

said first screw and said compression valve having passages in communication with one another to in part define said first path.

2. An adjustment device according to claim 1 wherein said spring comprises Belleville washers mounted in opposition to one another and coaxially about said first screw.

3. An adjustment device according to claim 1 wherein said compression valve includes a hollow cylinder having axially spaced annular rings about said cylinder and at least one radial orifice between said rings for draining oil to the reservoir.

4. An adjustment device according to claim 1 wherein said first screw and said head have cooperating threads for adjusting the magnitude of the bias of the spring on the compression valve.

5. An adjustment device according to claim 1 wherein the first and second screws include means for identifying the shock absorber setting, said identifying means including at least one notch on the outside surface of said second screw parallel to its axis of symmetry and a radial slot on said first screw for containing a ball in said radial slot biased for engagement into the notch of the second screw.

6. An adjustment device according to claim 1 wherein the needle on said second screw and the third section of said first screw have complementary shapes in the form of respective truncated cones.

7. An adjustment device according to claim 1 wherein said first and second screws have externally exposed flats or slots for adjustment by wrenches and/or screwdrivers.

8. An adjustment device according to claim 1 wherein the outside surface of the compression valve includes at least one notch parallel to its axis of symmetry forming a part of said second oil path for said high speed adjustment means.

9. An adjustment device according to claim 1 including a purge means located on the monoblock head in registration with the reservoir attachment area and in communication with the duct through said cavity.

* * * * *